United States Patent
Nimblett, Jr. et al.

[11] Patent Number: 5,564,516
[45] Date of Patent: Oct. 15, 1996

[54] CLUTCHED ELECTRIC MOTOR STEERING SYSTEM

[75] Inventors: Francis E. Nimblett, Jr., Beverly; Marthinus van Schoor, Medford, both of Mass.

[73] Assignee: SatCon Technology Corporation, Cambridge, Mass.

[21] Appl. No.: 393,211

[22] Filed: Feb. 23, 1995

[51] Int. Cl.⁶ ............................................. B62D 5/06
[52] U.S. Cl. ............... 180/423; 180/446; 180/421; 180/417
[58] Field of Search .................. 180/132, 133, 180/141, 142, 143, 79.1

[56] References Cited

U.S. PATENT DOCUMENTS

| | | | |
|---|---|---|---|
| 2,228,032 | 1/1941 | MacGregor et al. | 324/392 |
| 2,932,257 | 4/1960 | Lupin | 417/16 |
| 2,977,813 | 4/1961 | Banker | 74/388 PS |
| 3,182,648 | 5/1965 | Schneider et al. | 123/335 |
| 3,280,557 | 10/1966 | Sattavara | 60/405 |
| 3,434,282 | 3/1969 | Shelhart | 60/405 |
| 3,528,522 | 9/1970 | Truke, Jr. | 180/271 |
| 3,612,202 | 10/1971 | Moon, Jr. | 180/14.3 |
| 3,734,226 | 5/1973 | MacDuff | 180/133 |
| 3,901,342 | 8/1975 | Nunn, Jr. | 180/133 |
| 3,954,147 | 5/1976 | Hollins | 180/133 |
| 4,044,786 | 8/1977 | Yip | 137/101 |
| 4,056,160 | 11/1977 | Abels et al. | 180/143 |
| 4,651,841 | 3/1987 | Adams | 180/142 |
| 4,751,978 | 6/1988 | Drutchas et al. | 180/142 |
| 5,299,650 | 4/1994 | Wada et al. | 180/79.1 |
| 5,307,892 | 5/1994 | Phillips | 180/79.1 |

*Primary Examiner*—Eric D. Culbreth
*Assistant Examiner*—Victor E. Johnson
*Attorney, Agent, or Firm*—David G. Conlin; Henry D. Pahl, Jr.

[57] ABSTRACT

In the hydraulically assisted steering system disclosed herein, a hydraulic pump for powering a steering servo is in turn driven either from the vehicle's engine, through an electrically controlled clutch, or by an electric motor which can drive the pump independently of the vehicle's engine. A signal is provided which varies as a function of vehicle's speed and disengagement of the clutch is enabled for vehicle speeds above a predeterminable threshold, thereby to reduce energy consumption. The clutch is engaged, independently of vehicle speed, under high load, e.g. emergency situations.

5 Claims, 4 Drawing Sheets

CLUTCHED ELECTRIC MOTOR STEERING SYSTEM

BACKGROUND OF THE INVENTION

The present invention relates to hydraulically assisted steering systems and more particularly to such a system in which a hydraulic booster pump can be, as a function of vehicle speed, selectively driven either from the vehicle's primary motive power source or from an electrical motor, thereby to reduce energy consumption at higher speeds when steering effort is typically low.

Hydraulic power steering systems of the direct engine driven type are very energy inefficient, particularly if the hydraulic servo system is of the open center valving type which allows a substantial hydraulic fluid flow even when the steering wheel is not being moved, i.e. when the vehicle is traveling straight and level. While energy efficiency can be improved by utilizing so-called closed center servo valving, it has not been possible to reliably manufacture such systems with a steering "feel" which is acceptable to consumers.

While it has been recognized that overall energy efficiency could be improved by driving a power steering hydraulic pump from an electric motor, such is system is not commercially feasible because of the very large motor which would be required to provide the power required under low speed operation e.g., during parking. Systems have also been heretofore proposed for initiating electrical motor energization of a power steering pump in the event that the vehicle's engine fails or stalls. Such systems are, for example, disclosed in U.S. Pat. Nos. 3,280,557; 3,434,282; 3,528,522; 3,734,226; 3,901,342; 3,954,147; and 5,299,650.

Among the several objects of the present invention are the provision of an assisted steering system which is energy efficient; the provision of such a system which can provide the power required for assisted steering during parking; the provision of such a system which reduces energy consumption during highway travel; the provision of such a system which is highly reliable and which is of relatively simple and inexpensive construction. Other objects and features will be in part apparent and in part pointed out hereinafter.

SUMMARY OF THE INVENTION

In accordance with one aspect of the present invention, a hydraulic power steering pump is energized selectively either from a vehicle's primary motive power source, i.e., its engine, or from a electric motor which can be relatively modestly sized. Energization of the electric motor is enabled as a function of vehicle speed.

In accordance with the practice of present invention a power steering pump is provided with means, including an electrically controllable clutch, for selectively coupling the pump to the vehicle's primary motive power source. An electric motor is provided for driving the pump independently of the vehicle's motive power source. A signal is generated which varies as a function of vehicle speed and control means are provided responsive to that signal for enabling disengagement of the clutch for vehicle speeds above a predeterminable threshold. Preferably, the clutch is engaged, independently of vehicle speed, in high load situations.

DESCRIPTION OF THE PREFERRED EMBODIMENT

Figure 1:
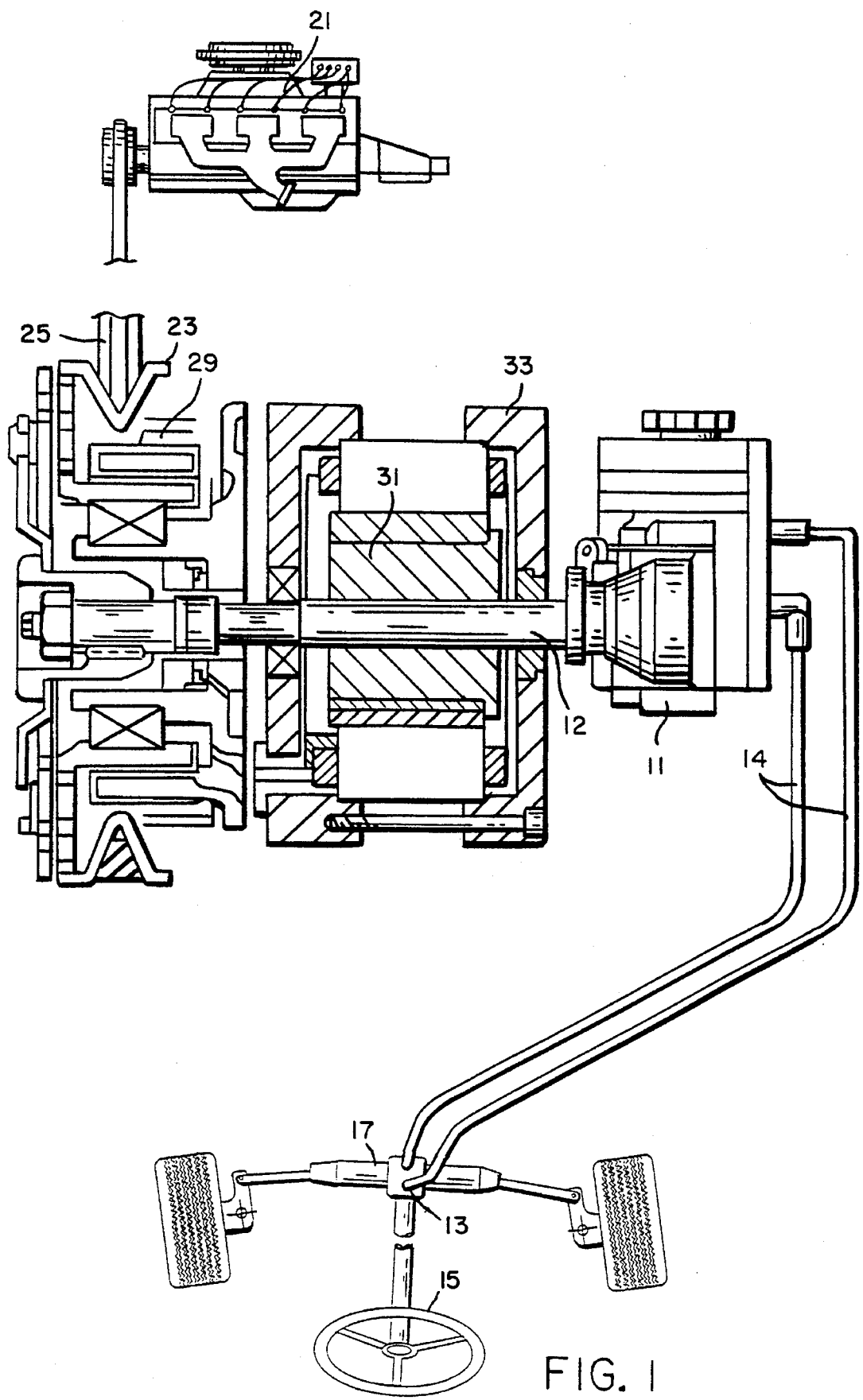
FIG. 1 is a diagram illustrating the mechanical components of a hydraulically assisted steering system in accordance with the present invention.

Referring now to FIG. 1, the hydraulically assisted steering system illustrated there employs a conventional rotary hydraulic pump, designated by reference character 11, which includes a flow control valve for modulating hydraulic fluid flow at higher shaft speeds. The pump shaft, which also links various other components as described hereinafter, is designated by reference character 12. Pump 11 provides hydraulic fluid flow to a hydraulic servo booster indicated diagrammatically at reference character 13. Servo booster 13 is interposed between a steering wheel 15 and rack and pinion steering components designated by reference character 17.

The vehicles primary motive power source e.g., an internal combustion engine, is indicated diagrammatically at reference character 21. A pulley 23 journaled about shaft 12 is driven from the engine 21 through a v-belt 25. The pulley 23, in turn, can be selectively coupled for driving the pump shaft 12 through an electro-mechanical clutch designated generally by reference character 29. Clutch 29 may be of the general type commonly employed for selectively engaging automotive air conditioning compressors.

Also mounted on shaft 12 is the rotor 31 of a variable speed electric motor designated generally by reference character 33. Motor 33 is sized so that its maximum power output corresponds to the levels required by the pump 11 for normal maneuvering while driving at traffic speeds, i.e. as opposed to the greater power required for parking maneuvers.

Figure 2:
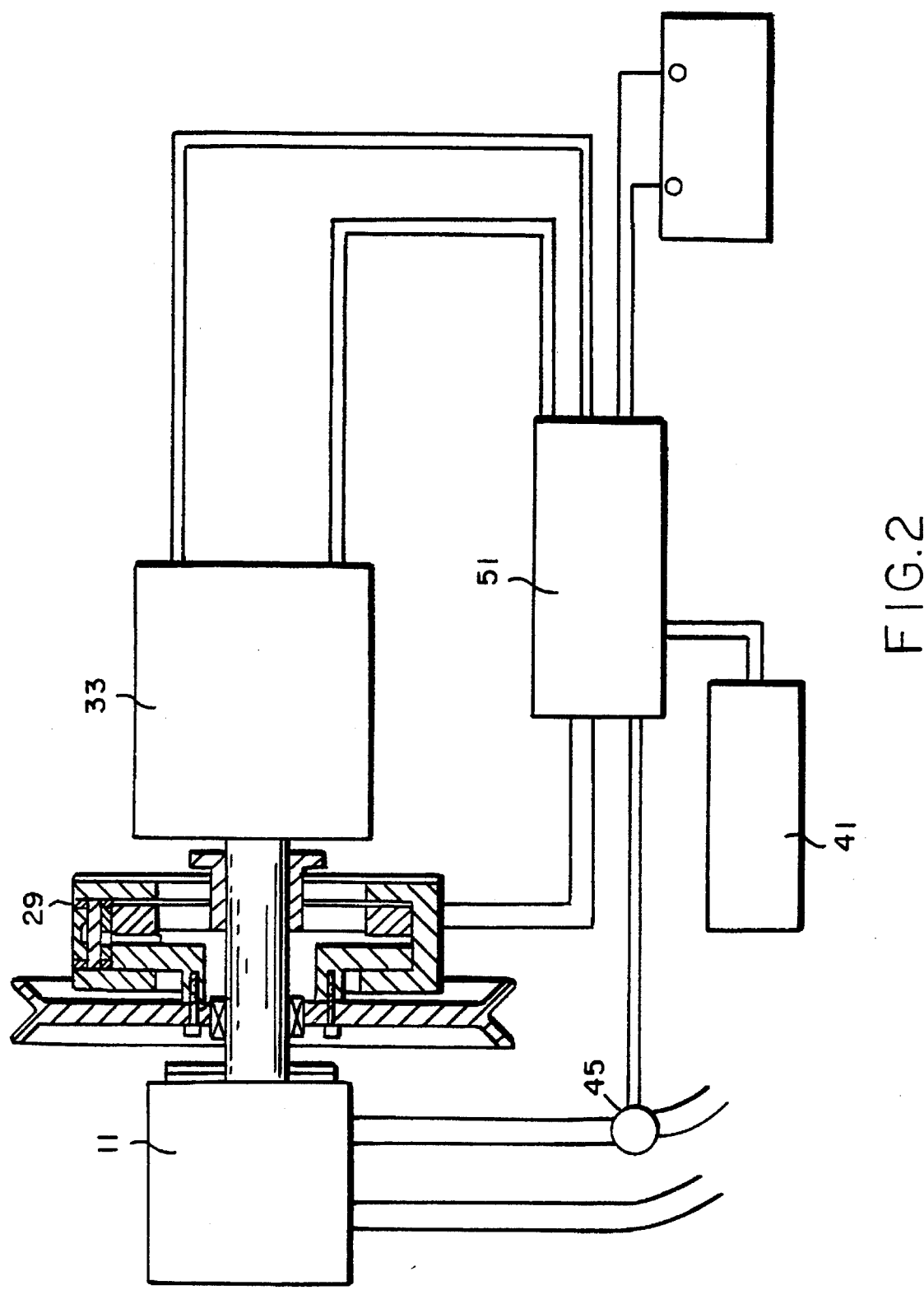
FIG. 2 is an overall block diagram of an electrical control system in conjunction with the mechanical pump driving components of FIG. 1 showing in overall fashion provision for alternate energization.

Referring now to FIG. 2, a conventional speedometer sensor 41 is utilized to provide a signal which varies as a function of vehicle speed. As will be understood, this sensor can be used both for the speedometer and for the control system of the present system. A pressure switch 45 is also provided for sensing the pressure at the outlet of pump 11, to represent the load on the steering system. An alternative to the pressure switch is to sense the load on the motor 33 since this signal is utilized to effect transfer of power source from the electric motor to the vehicle's motive power source as described in greater detail hereinafter. Signals from the sensors 41 and 45 are provided to control circuitry, designated generally by reference character 51, which controls the energization of clutch 29 and motor 33.

Figure 4:
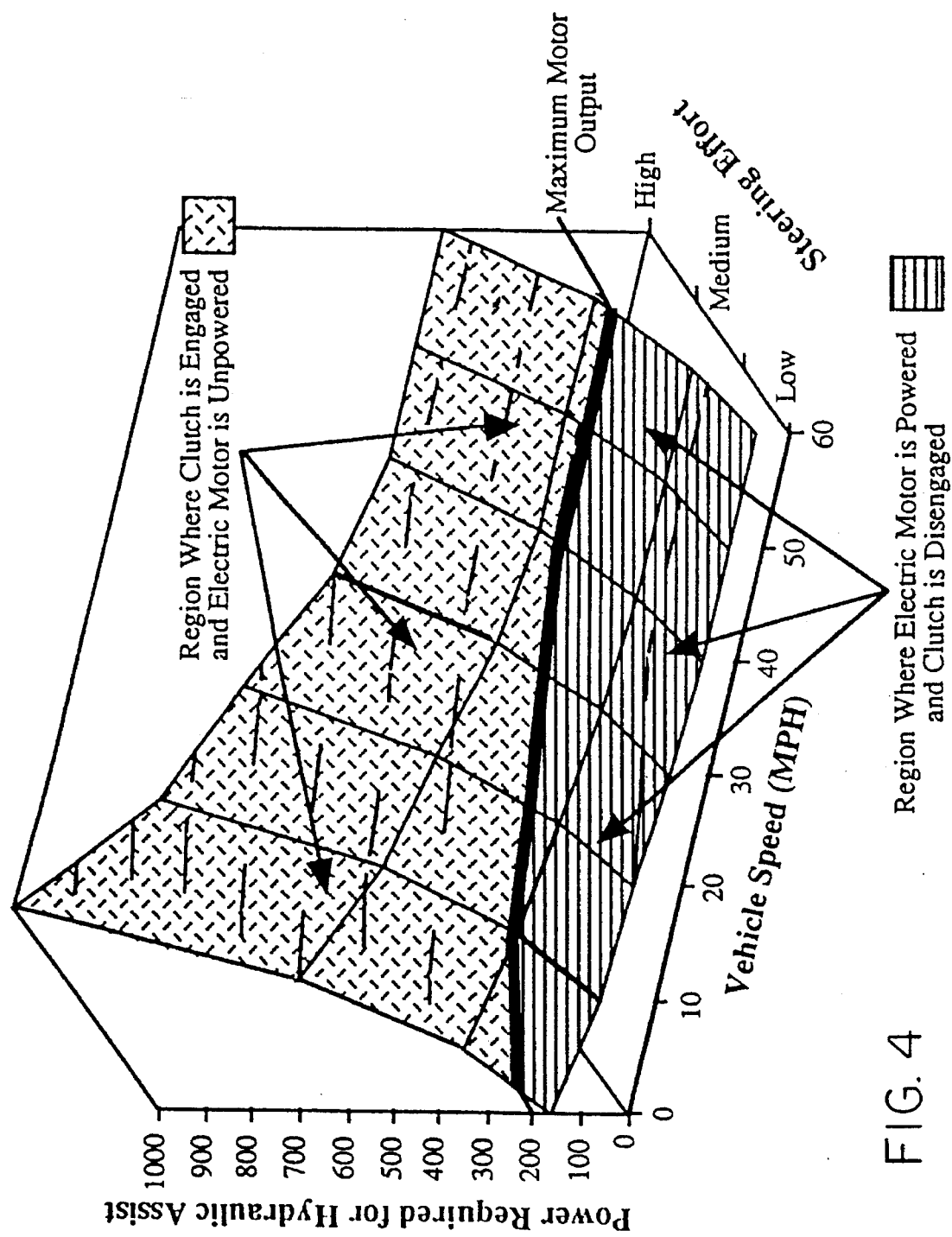
FIG. 4 graphically represents the power requirements of a hydraulic steering system Corresponding reference characters indicate corresponding parts throughout the several views of the drawings.

FIG. 4 is a graphical representation of a three-dimensional surface representing the power requirements of a hydraulic steering system. In general, it may be noted that the power required is a function of a vehicle speed i.e., the requirement is lower at higher speeds. The power required is also a function of steering effort. As is understood, parking lot operation and evasive maneuvers require more power.

In general, it is a function of the control electronics 51 to provide the necessary mechanical power through the electric motor 33 for the lower level power requirements region and to derive the increased power levels needed for parking or evasive maneuvers from the vehicles' engine, i.e. by engagement of the clutch 29. Basically the operation of the controller is to utilize the signal provided by the speed sensor 41 to enable disengagement of the clutch only for vehicle speeds above a predeterminable threshold, the threshold being adjustable in accordance with various conditions as described hereinafter. When the clutch 29 is disengaged, the controller modulates the energization of the electric motor 33 so as to maintain pump speed according to a predetermined pump speed vs. vehicle speed curve. Data defining this transfer function may, for example, be stored in a read only memory (ROM) of a micro processor controller.

The operation provided by the controller 51 may be summarized as follows. When the electrical motor's maximum power is exceeded, e.g., as sensed by the pressure switch 45 on the output line of pump 11, the controller will energize the electro-mechanical clutch 29. After a short delay which is needed for a smooth transition, the motor power is ramped down i.e., decreased gradually rather than abruptly. The flow control valve in the hydraulic pump will maintain constant flow essentially irrespective of engine/clutch speed.

Conversely when the load drops below the capability of electrical motor 33, the power to the motor is restored, again progressively rather than abruptly. Then, after a short delay, the controller deactivates the electrical mechanical clutch provided the vehicle's speed, as determined by sensor 41, is above a predetermined threshold.

As will be understood from the foregoing, the deenergization or disengagement of the clutch does not necessarily occur just because the vehicle speed crosses above a predetermined threshold. Rather, the disengagement of the clutch is conditioned also upon the power demand being within the capability of the electric motor 33. Accordingly it is more properly stated that the controller responds to the speed signal to "enable" disengagement of the clutch for vehicle speeds above the predeterminable threshold. In practice, however, this mode of operation can cause disengagement of the clutch, with a concomitant reduction in energy drained from the vehicles engine, over a substantial percentage of the time in normal operation of an automotive vehicle. Indeed, in typical commuting and/or cross country travel the clutch will be engaged only a small percentage of the time e.g., during parking or other low speed maneuvers and, on rare occasion, on emergency evasive action at higher speed. Since the appropriately size electric motor is substantially more efficient at low required power levels than the direct drive from the vehicle's engine, a substantial overall savings can be obtained.

Figure 3:
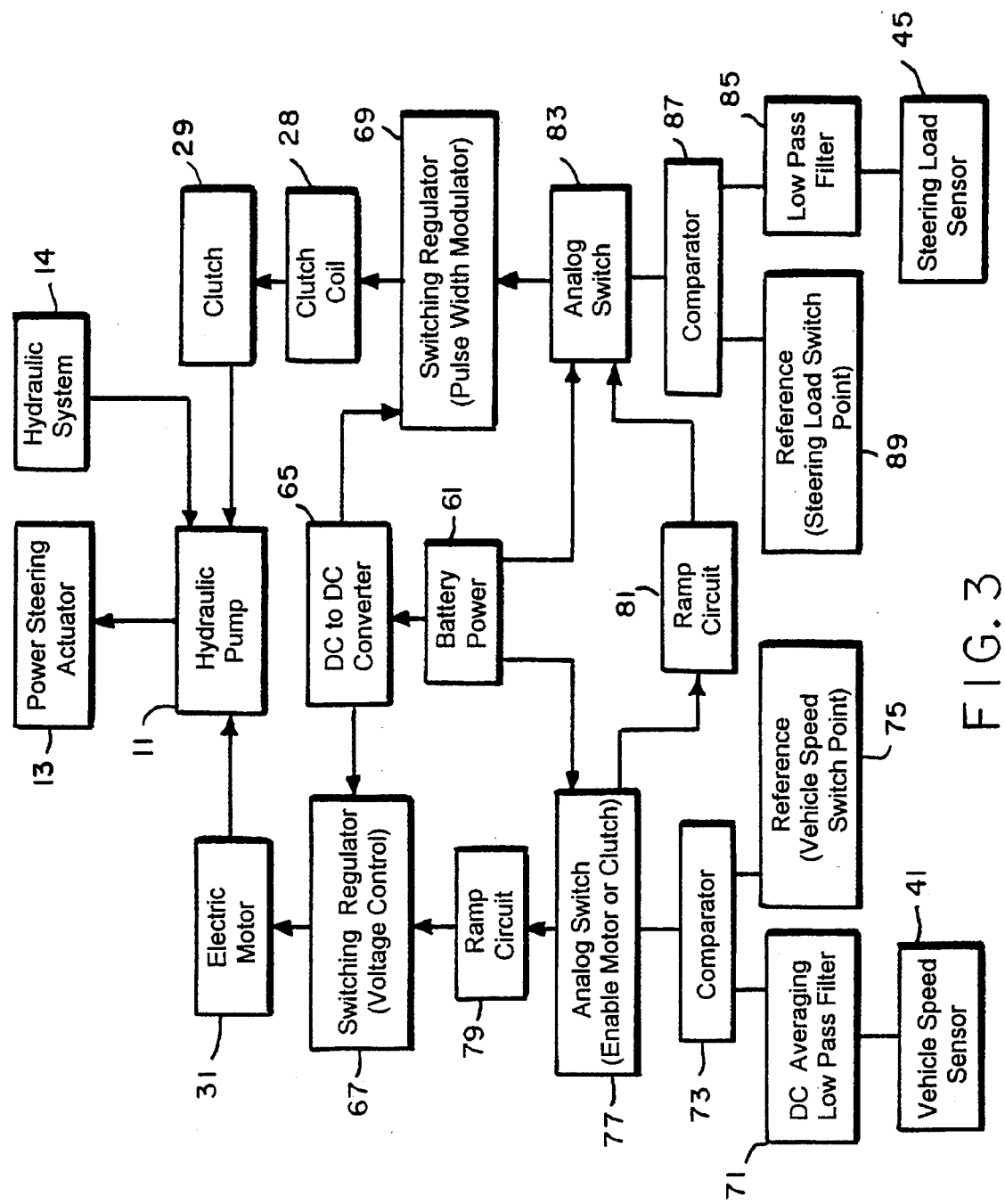
FIG. 3 is a block diagram illustrating in greater detail the control electronics employed in FIG. 2.

FIG. 3 is a block diagram illustrating, in greater detail, a particular implementation of control electronics for appropriately coordinating the operation of the clutch 29 and electric motor 31. Battery power, as indicated at block 61, is applied to a DC to DC converter 65 which provides DC power at appropriate voltage levels for energizing the electric motor 31 and the coil 28 which operates the clutch 29. In each case, the power level can be controlled by means of a respective switching regulator, designated by reference characters 67 and 69.

The signal from the vehicle speed sensor 41, typically comprising a series of pulses, is passed through a low-pass filter 71 which eliminates any rapid perturbations. The filtered signal is applied to a comparator 73 which compares the sensed speed with a signal representing the preselected switch point, the source of this reference signal level being indicated by reference character 75. When the vehicle speed exceeds; the preselected reference level, the comparator 73 operates; an analog switch 77 which initiates the operation of a ramp circuit 79 which causes power to be progressively applied, by means of the switching regulator 67, to the electric motor 31.

Conversely, as vehicle speed comes down and passes below the reference level, the analog switch circuitry 77 initiates the operation of another ramp circuit 81 which, through an analog switching circuit 83, causes power to be progressively applied to the coil 28 which engages the clutch.

As indicated previously, while the disengagement of the clutch may be enabled by the detection of vehicle speeds above a reference level, this disengagement can be overridden to provide a higher power level in case of emergency operations. A signal from the steering load sensor 45 is applied, through a low-pass filter 85, to one input of a comparator 87. Comparator 87 compares the sensed load with a reference point, provided as indicated at block 89. If the load is greater than the reference level, the comparator controls the analog switching circuitry 83 to effect energization of the clutch, without any delay or ramping.

As indicated previously, the effect of this control operation in typical automotive uses will be to cause the power steering to be operated through the electric motor for a great majority of the time and with the clutch being engaged to obtain direct drive only infrequently, i.e., at low speed or parking type maneuvers, or, on rare occasion, in an emergency high speed maneuver.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In an automotive vehicle having a primary motive power source and a hydraulic servo booster, including a rotary pump, for reducing steering effort, a system for driving said pump comprising:

means for selectively coupling said pump to said primary motive power source, said means including an electrically controllable clutch;

an electric motor for driving said pump independently of said motive power source;

means providing a signal which varies as a function of steering effort;

means for energizing said clutch if the steering effort exceeds a preselected level;

means providing a signal which varies as a function of vehicle speed; and means responsive to said signal for enabling disengagement of said clutch and energization of said electric motor for vehicle speeds above a predeterminable threshold.

2. In an automotive vehicle having a primary motive power source and a hydraulic servo booster, including a rotary pump, for reducing steering effort, a system for driving said pump comprising:

means for selectively coupling said pump to said primary motive power source, said means including an electrically controllable clutch;

an electric motor for driving said pump independently of said motive power source;

means providing a signal which varies as a function of vehicle speed; and control means responsive to said signal for both energizing said electric motor and enabling disengagement of said clutch for vehicle speeds above a predeterminable threshold.

3. A pump driving system as set forth in claim 2 further comprising means for sensing the load on said pump and means for energizing said clutch if said load exceeds a preselected level.

4. A pump driving system as set forth in claim 2 further comprising a ramp circuit for causing said motor to be energized progressively when the vehicle speed rises above said threshold.

5. In an automotive vehicle having an internal combustion engine as a primary motive power source and a hydraulic servo booster, including a rotary pump, for reducing steering effort, a system for driving said pump comprising:

means for selectively coupling said pump to said engine, said means including a belt driven, electrically controllable clutch;

an electric motor for driving said pump independently of said engine;

means for providing a signal which varies as a function of steering effort;

means for engaging said clutch if the steering effort exceeds a preselected level;

means providing a signal which varies as a function of vehicle speed; and means responsive to said signal for energizing said electric motor and for enabling disengagement of said clutch for vehicle speeds above a predeterminable threshold.

\* \* \* \* \*